Aug. 20, 1935.    M. BOSCH    2,011,612

FREQUENCY CONVERTER SYSTEM

Filed April 12, 1933

WITNESSES:
Fred. E. Williams
S. A. Stricklett

INVENTOR
Max Bosch
BY O. B. Buchanan
ATTORNEY

Patented Aug. 20, 1935

2,011,612

UNITED STATES PATENT OFFICE 2,011,612

FREQUENCY CONVERTER SYSTEM

Max Bosch, Berlin-Reinickendorf/Ost, Germany, assignor to Westinghouse Electric & Manufacturing Company, East Pittsburgh, Pa., a corporation of Pennsylvania Application April 12, 1933, Serial No. 665,753
In Germany April 28, 1932

7 Claims.  (Cl. 172—281)

My invention relates to a frequency converter system and particularly to means for preventing equalizing currents in a vapor-electric frequency converter.

In the operation of frequency converters, the wave of the lower frequency is built up of a plurality of chopped sections of the waves of the higher frequency. For this purpose a plurality of rectifier tanks are used and alternate half waves of the lower frequency supplied alternately by each rectifier tank. Since both rectifier tanks must constantly be ready to carry current, and since the output voltage of any rectifier tank is not constantly greater than the half wave being supplied to the lower frequency, equalizing currents may flow between the alternate tanks.

Besides increasing the reactive component of the current taken by the rectifier, these equalizing currents, if large enough, may cause failure of the converting system. It is accordingly an object of my invention to provide a converter system having means for preventing equalizing currents between the rectifying tanks;

It is a further object of my invention to prevent the inactive tank from becoming active until the cessation of current in the active tank.

In the device according to my invention the current flowing from one of the converter tanks is utilized to prevent current flow in the alternate tank. This may be done either by biasing the grid of an auxiliary discharge device in series with the rectifier, or by biasing the normal grids of the rectifier proper.

Figure 1:
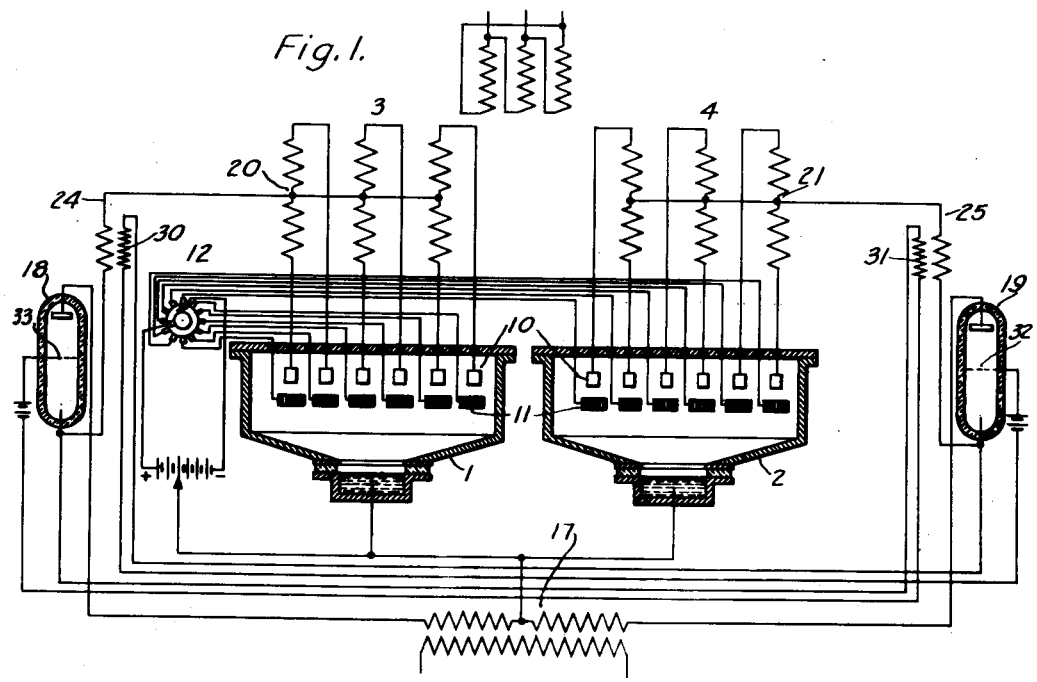
Figure 2:
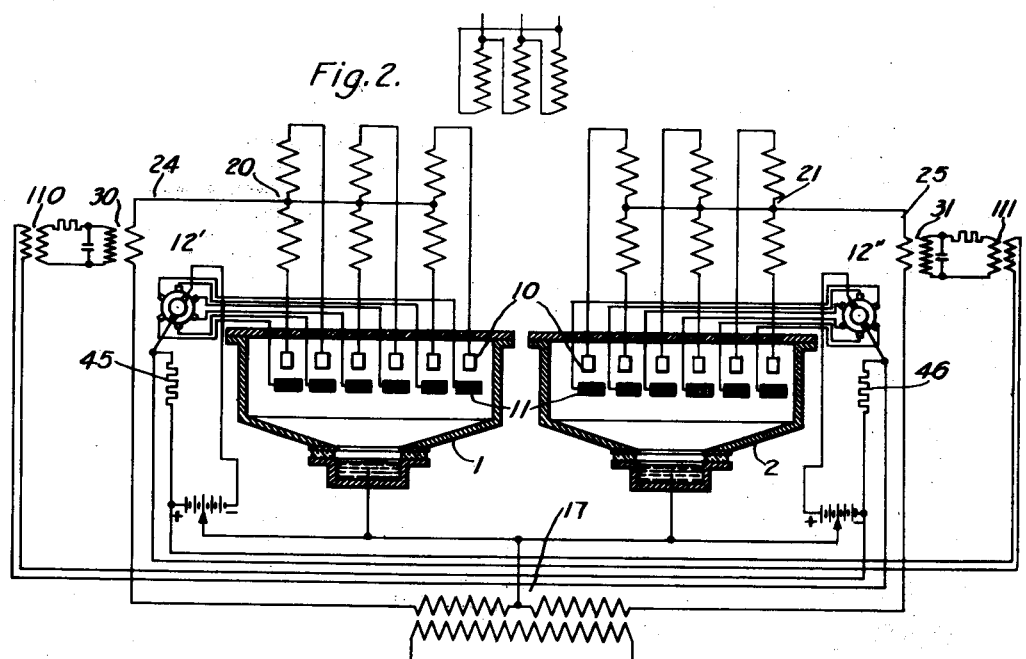

Other objects and advantages of my invention will be apparent from the following detailed description, taken in conjunction with the accompanying drawing, in which:

Figure 1 is a schematic illustration of a converter system embodying an auxiliary discharge device for preventing circulated currents in the converter tanks; and, Fig. 2 is a modification showing the direct application of biasing current to the normal control grids of the converter tanks.

The apparatus according to my invention comprises two separate vapor-electric discharge devices 1—2 supplied with a polyphase voltage of the higher frequency by a transformer or transformers having separate secondaries 3—4, each secondary supplying the anodes 10 in one of the rectifier tanks. A grid control system 12 is provided for biasing the control grids 11 of the rectifier tanks 1—2 so that current is carried alternately by the two tanks. While any suitable grid control may be used, I prefer to use the well known synchronous commutator having a narrow segment connected to the positive terminal of the control source and a large segment connected to the negative terminal.

When one of the tanks is carrying current, the current flows through half of the load transformer 17 and through auxiliary discharge devices 18—19 back to the neutral points 20 or 21 of the supply transformer of the tank carrying current. Each of the tanks 1—2 is provided with an auxiliary discharge device 18 or 19 in the neutral return circuit 24—25. Consequently, as the alternate tanks 1—2 discharge the current flows through alternate paths of the load transformer 17 and alternately through the auxiliary discharge devices 18—19. The load circuit 24—25 of each of the rectifying tanks is provided with a current transformer 30—31 for supplying a control voltage for a grid 32—33 in the alternate auxiliary rectifier. Consequently, when current is flowing through the output lead of the rectifier tank 1, the current transformer 30 impresses a biasing potential on the grid 32 of the alternate auxiliary discharge device 19. Consequently, as long as any current flows through rectifier lead 24, no current can flow in the auxiliary discharge device 32 of the alternate tank 2.

However, when the current in tank 1 has been interrupted because of operation of the current control 12, the current transformer 30 will no longer impress a control voltage on the grid 32 of the auxiliary discharge device 19 and it may start to carry current. As soon as this happens, the current transformer 31 in circuit 25 will be energized and block out the auxiliary discharge device 18 attached to the first rectifier. Since only one tank can carry current at any given instant, circulating currents are impossible and the losses and dangers encountered because of circulating currents are eliminated.

In the modification according to Fig. 2, the current transformer 30—31 in the output circuit of one of the rectifier tanks is connected by means of a saturated transformer 110—111 to a resistor 45—46 in series with the biasing potential applied to the alternate rectifier tank. Because of the saturated transformers 40, the biasing potential will have a substantially flat-top wave and will maintain the control currents of the alternate rectifier 2 inoperative until the current has died out of the first current transformer 30. This will release the grids 11 of the alternate rectifier 2 and permit current flow in the opposite direction through the load transformer 17. This, in turn, will energize current transformer 31 in the output circuit of the second tank and block operation of alternate tank 1 until the grid control device 12' has stopped current flow in the active tank.

While I have shown and described specific embodiments of my invention, it is apparent that changes and modifications may be made therein without departing from the spirit and scope of my invention. I desire, therefore, that only such limitations shall be imposed as are embodied in the accompanying claims or as may be necessitated by the prior art.

I claim as my invention:

1. A frequency converter comprising a plurality of vapor-electric rectifiers, an output transformer supplied by said rectifiers, an auxiliary discharge device in series with each rectifier, and means operated by current flow through one of said devices to hold the other inoperative.

2. A frequency converter comprising a plurality of vapor-electric rectifiers, an output transformer supplied by said rectifiers, an auxiliary discharge device in series with each rectifier, a control grid in each of said auxiliary devices, a current transformer in series with each of the auxiliary devices for supplying grid current, said current transformers being connected to the grids of the opposite devices so that flow of current in one of said devices blocks current flow in the other.

3. A frequency converter comprising a plurality of mercury-arc rectifiers, an alternating current source for supplying said rectifiers, an alternating current circuit fed alternately by said rectifiers, and an electrical interlock for preventing simultaneous operation of said rectifiers.

4. A frequency converter comprising a plurality of mercury-arc rectifiers, an alternating current source for supplying said rectifiers, an alternating current circuit fed alternately by said rectifiers, an interlock comprising a current transformer associated with each rectifier and grids controlled by said current transformers for preventing simultaneous current flow in said transformers.

5. A frequency converter comprising a plurality of rectifiers, an output transformer supplied by said rectifiers, a current transformer in the output circuit of each rectifier, said current transformer actuating a grid for preventing current flow in the other rectifier while current flows in the current transformer.

6. In a reversible electric current converting system, an electric current line, a second electric current line, electron discharge means comprising a plurality of electrically distinct circuits, means for connecting said discharge means with each of said lines, means for controlling the operation of said discharge means, and means responsive to the flow of current through one of said circuits to prevent flow of current through another of said circuits.

7. In a reversible electric current converting system, an electric current line, a second electric current line, a plurality of electrically distinct electron discharge devices each having anodes with associated control electrodes and a cathode, means for connecting said discharge devices with each of said lines, means for energizing the control electrodes of said devices, and means responsive to the flow of current through one of said discharge devices operable to prevent the flow of current through another of said discharge devices.

MAX BOSCH.